W. H. HOLLAR.
AUTOMOBILE FUEL TANK.
APPLICATION FILED APR. 12, 1910.
1,105,272.
Patented July 28, 1914.
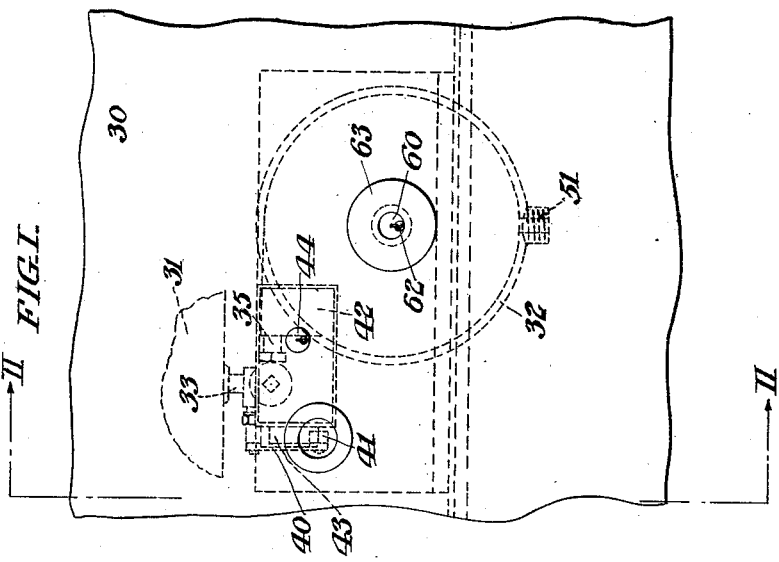
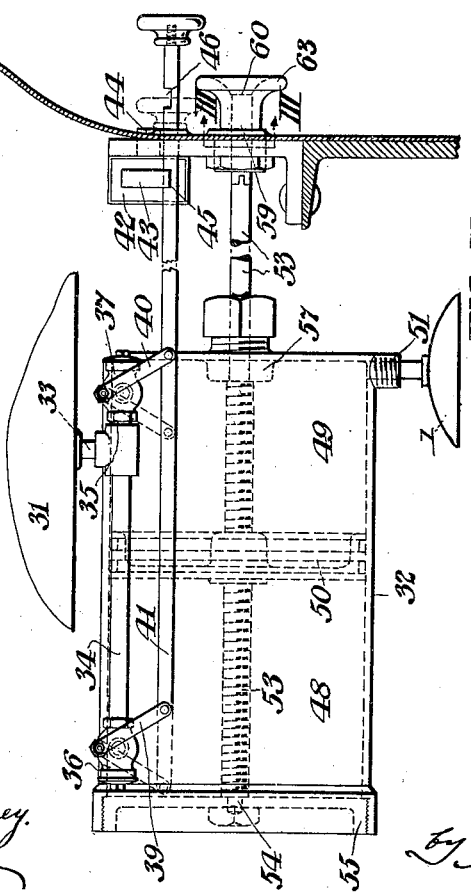
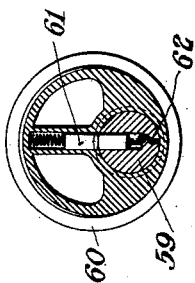
WITNESSES:
Philip W. Vessey.
P. Schleicher.
INVENTOR:
WILLIAM. H. HOLLAR,

UNITED STATES PATENT OFFICE.

WILLIAM H. HOLLAR, OF PHILADELPHIA, PENNSYLVANIA.

AUTOMOBILE FUEL-TANK.

1,105,272.           Specification of Letters Patent.        Patented July 28, 1914.

Application filed April 12, 1910. Serial No. 554,965.

*To all whom it may concern:*

Be it known that I, WILLIAM H. HOLLAR, of Philadelphia, in the State of Pennsylvania, have invented a certain new and useful Improvement in Automobile Fuel-Tanks, whereof the following is a specification, reference being had to the accompanying drawings.

The object of my invention is to prevent unauthorized use of a self propelled vehicle by predetermined limitation of the supply of energy to the motor by which it is propelled.

Broadly stated my invention consists in providing an auxiliary source of energy in addition to the main source of energy for said motor, and means to restrict said motor to said auxiliary source to the exclusion of said main source. For instance, as hereinafter described, my invention may be applied to an engine driven automobile by providing the engine with two distinct sources of fuel, and controlling means, whereby, one source including a main supply may be placed in communication with the motor when it is desired to operate the latter without restriction, and, the other source including an auxiliary predetermined limited supply may be placed in communication with the motor to the exclusion of the main supply when it is desired to restrict the operation of the automobile.

My invention includes the provision of locking means to prevent unauthorized change in the controlling means aforesaid, and, the various novel features of construction and arrangement hereinafter more definitely specified.

Figure I is a fragmentary side view of an automobile embodying a modified form of my invention. Fig. II is a fragmentary sectional view, taken on the line II, II in Fig. I. Fig. III is a transverse sectional view, taken on the line III, III in Fig. II.

Referring to the form of my invention shown in Figs. I to III inclusive; the automobile 30 is provided with the main fuel tank 31 and the auxiliary fuel tank 32, the latter being connected with said main fuel tank by the pipe 33 having the branches 34 and 35 leading into said auxiliary tank 32 through the respective valves 36 and 37 at opposite ends thereof. Said valves 36 and 37 are provided with respective operating levers 39 and 40 whereby they may be opened and closed, being open in the position shown in full lines in Fig. II and closed in the position indicated in dotted lines in said figure. Said valve levers 39 and 40 are coupled by the bar 41 extending through the side of the automobile 30 in operative relation with the lock 42 having the slide bolt 43 arranged to be operated by a key inserted in the keyway 44 so that the notches 45 and 46 in said bar 41 may be alternately engaged by said lock bolt 43 to hold said valves 36 and 37 in either open or closed position. When said valves are in the open position, as indicated, the fuel passes from the main tank 31 into the auxiliary tank 32 and fills the two compartments 48 and 49 thereof respectively on opposite sides of the adjustable diaphragm or piston 50; said chambers 48 and 49 being respectively in communication with the branch pipes 34 and 35 through said valves. Said chamber 49 is provided with the outlet 51 through which the fuel is directed to the motor; when said valves are in the open position, the main fuel supply tank 31 is in communication with the motor by way of said chamber 49, and all of the fuel supply may be used without restriction, except that the fuel in the chamber 48 is retained therein as a reserve supply which may be used after the main tank 31 and said auxiliary tank chamber 49 are drained, it being necessary, however, to shift said diaphragm 50 to the inner end of the chamber 48 to force the contents of the latter backward through the pipes 34 and 35 and into the chamber 49 when it is desired to use said reserve supply. Said diaphragm 50 in the auxiliary tank 32 may be shifted as above contemplated, or set in any desired position to determine the precise capacity of the chambers 48 and 49, by rotation of the screw shaft 53 which is journaled in the bearing 54 in the inner removable head 55 of said tank 32 and in the bearing 57 at the outer end of said tank 32 and extends in operative engagement with the rotary cylinder 59 of the lock 60. It may be observed that the packing rings in the periphery of said diaphragm 50 indicated in dotted lines in Fig. II not only make a fluid tight joint between said diaphragm and the tank 32 but also prevent rotation of said diaphragm. Said lock 60 is of the Yale type, having pin tumblers 61 normally engaging said cylinder 59 and preventing the rotation thereof. However, said cylinder 59 may be released upon the insertion of a suitable key in the keyway 62 opening through the handle 63 which is carried by said cylinder 59, and, the arrangement is such that when thus released, said cylinder 59 may be rotated by said handle 63 to rotate said shaft 53 in screw threaded engagement with said diaphragm 50 to shift the latter in either direction. It is to be understood that said diaphragm 50 may be thus shifted to variably limit the capacity of the auxiliary fuel supply chamber 49, which cannot be changed except by a person having a key for the lock 60, and, that when the valves 36 and 37 are closed, the motor in connection with the outlet 51 is restricted to the auxiliary supply of fuel contained in said chamber 49, to the exclusion of the main supply of fuel contained in said tank 31, and to the exclusion of the reserve supply contained in said chamber 48. Consequently, the operation of the automobile is limited in accordance with the capacity of said chamber 49 whenever said valves 36 and 37 are closed, and, said valves cannot be reopened except by a person having a key for the lock 42. Moreover, it may be observed that although a person having a key to the lock 42 may use all of the fuel supply contained in the main tank 31 and in the auxiliary tank chamber 49, the reserve supply contained in the chamber 48 may only be used with the knowledge or consent of a person having a key to the lock 60.

Although I have illustrated my invention as applied to an automobile having an internal combustion motor, it is to be understood that other types of motors may be employed, and, that my invention is applicable to other self-propelled vehicles, for instance, boats, aeroplanes and dirigible balloons. Therefore, I do not desire to limit myself to the precise details of construction and arrangement herein set forth as it is obvious that various modifications may be made therein without departing from the essential features of my invention as defined in the appended claims.

I claim:—

1. The combination of a main tank, an auxiliary tank, a conduit therebetween, means for cutting off communication through said conduit, means for locking said cutting off mechanism against unauthorized use, means for varying the working volume of said auxiliary tank, and means for locking said varying means in any one of several adjusted positions.

2. The combination of a main tank, an auxiliary tank, a conduit therebetween, a cut off plug in said conduit, means for locking said plug, a piston operating in said auxiliary tank, and means for locking said piston against unauthorized use in any one of several positions to vary the working volume of said tank.

3. The combination of a main tank, an auxiliary tank, a conduit therebetween, means for cutting off communication through said conduit, means for positively varying the working volume of said auxiliary tank, including a rotatable screw shaft in said auxiliary tank and a diaphragm threaded on said shaft, and means for locking said varying means in any one of several adjusted positions.

4. The combination of a main tank, an auxiliary tank, a conduit therebetween, a cut off valve in said conduit, and means for positively varying the working volume of said auxiliary tank, including a movable diaphragm and means for rigidly securing said diaphragm in adjusted position in said auxiliary tank.

5. The combination of a main tank, an auxiliary tank, a conduit between them, means for varying the working volume of said auxiliary tank, and means for locking said varying means in any one of several positions of adjustment.

6. The combination of a main tank, an auxiliary tank, a conduit between them, and positive means for cutting off communication between said tanks and preventing increment of the working volume of said auxiliary tank.

7. The combination of a main tank, an auxiliary tank having two compartments, means for establishing communication between said tanks and between said compartments, and positive means for cutting off communication between said tanks and preventing increment of the working volume of said auxiliary tank.

In testimony whereof, I have hereunto signed my name at Philadelphia, Pennsylvania, this ninth day of April, 1910.

WILLIAM H. HOLLAR.

Witnesses:
ARTHUR E. PAIGE,
AL DOHERTY.

---

Copies of this patent may be obtained for five cents each, by addressing the "Commissioner of Patents, Washington, D. C."